US008421278B2

(12) United States Patent
Yamamoto et al.

(10) Patent No.: US 8,421,278 B2
(45) Date of Patent: Apr. 16, 2013

(54) POWER FEEDING CONTROL APPARATUS AND CHARGING SYSTEM

(75) Inventors: Yuzo Yamamoto, Ibaraki (JP); Kiichiro Uno, Ibaraki (JP); Hideyuki Higo, Saitama (JP); Mitsuo Ikeda, Tokyo (JP)

(73) Assignees: Japan Atomic Energy Agency, Ibaraki (JP); Hitachi Industrial Equipment Systems Co., Ltd., Tokyo (JP)

( * ) Notice: Subject to any disclaimer, the term of this patent is extended or adjusted under 35 U.S.C. 154(b) by 373 days.

(21) Appl. No.: 12/494,749

(22) Filed: Jun. 30, 2009

(65) Prior Publication Data

US 2010/0079000 A1    Apr. 1, 2010

(30) Foreign Application Priority Data

Sep. 30, 2008   (JP) ................................. 2008-252621

(51) Int. Cl.
*H02J 3/14*   (2006.01)
(52) U.S. Cl.
USPC ............................ 307/149; 307/150; 320/138
(58) Field of Classification Search ............. 307/64–66, 307/149, 150; 320/137–167
See application file for complete search history.

(56) References Cited

U.S. PATENT DOCUMENTS

| 5,111,132 A | * | 5/1992 | Motose ........................... 322/90 |
| 5,744,936 A | * | 4/1998 | Kawakami ..................... 320/120 |
| 5,969,624 A | * | 10/1999 | Sakai et al. ................. 340/636.1 |
| 7,705,491 B2 | * | 4/2010 | King et al. ....................... 307/80 |
| 7,705,567 B2 | * | 4/2010 | Okamura et al. ............. 320/166 |

FOREIGN PATENT DOCUMENTS

| JP | 03-015232 | 1/1991 |
| JP | 08-182209 | 7/1996 |
| JP | 2004-328875 | 11/2004 |
| JP | 2008-086065 | 4/2008 |

OTHER PUBLICATIONS

Machine translations for JP2008-86065 and 2004-328875.*

* cited by examiner

*Primary Examiner* — Fritz M Fleming
(74) *Attorney, Agent, or Firm* — Antonelli, Terry, Stout & Kraus, LLP.

(57) ABSTRACT

In order to actualize a power feeding control apparatus and a charging system that are capable of efficiently charging plural storage batteries using a load-capacity controlled power source, the power feeding control apparatus 1 is configured so that a changeover control of the feeding of the alternating-current voltage to each charger will be performed monitoring the magnitude of the alternating current flowing in each of the plural chargers 4 to 6, therewith, the power feeding control apparatus performs the feeding changeover control comprising the steps of: feeding only to a predetermined one particular charger at the early stage of the start of charging, in which stage a large charging current flows into a storage battery; monitoring inflow current of the predetermined one particular charger; and switching power feeding to another charger to start feeding thereto when the inflow current reduces to the charging saturation current (a current still flowing even at the fully charged state).

4 Claims, 10 Drawing Sheets

FIG. 12

POWER FEEDING CONTROL APPARATUS AND CHARGING SYSTEM

BACKGROUND OF THE INVENTION

The present invention relates to a power feeding control apparatus and a charging system.

There are many units of equipment or facilities that use charged storage batteries (rechargeable storage batteries or capacitors) as their power supply units. Mostly, charging the storage battery used as such a power supply unit is performed using a direct-current power source provided by a charger connected to a commercial power supply outlet, wherein the charger rectifies and smoothes the alternating-current voltage received from the outlet to output direct current for charging.
[Patent Literature 1] Publication of Japanese Unexamined Patent Application, Hei 8-182209

SUMMARY OF THE INVENTION

The load capacity rate of the general-purpose outlet on a commercial power supply is controlled by a regulation to be within 100 V, 1.5 kVA for one single outlet. This limitation makes it difficult to compose such a battery charging system as charges plural storage batteries in an electrically parallel manner using plural chargers under one single outlet. That is: the load current on the outlet possibly become in excess of its permitted limit at the early stage of charging since a large charging current flows into the storage battery at the beginning of charging. This sort of problem can arise not only in such load capacity limitation on one single outlet but also in other kind of load restriction under the commercial power source from which the charger is power-supplied.

An advantage of the present invention is to actualize a power feeding control apparatus and a charging system that are capable of efficiently charging plural storage batteries using a power source of which load-capacity is controlled.

Another advantage of the present invention is to actualize a power feeding control apparatus and a charging system that are capable of efficiently charging plural storage batteries using a commercial power supply of which load-capacity is controlled.

Further another advantage of the present invention is to actualize a power feeding control apparatus and a charging system that are capable of efficiently charging plural storage batteries using a single outlet of a commercial power supply of which load-capacity is controlled.

Again further another advantage of the present invention is to actualize a power feeding control apparatus and a charging system that are capable of efficiently charging plural storage batteries using a single general-purpose outlet with a controlled load-capacity (to be within 100 V, 1.5 kVA) under a commercial power supply.

Still further another advantage of the present invention is to actualize a power feeding control apparatus and a charging system that are capable of transmitting an E-mail of the working status over a communication line.

The present invention offers a charging system structured in such a manner that a power feeding control apparatus distributes the alternating-current voltage received from a single alternating-current power source to plural chargers; each of the plural chargers rectifies and smoothes the alternating-current voltage received from the alternating-current power source; and thereby plural storage batteries connected to each of the plural chargers can be charged parallel, wherein the power feeding control apparatus is configured so that a changeover control of the feeding of the alternating-current voltage to each charger will be performed monitoring the magnitude of the alternating current flowing in each charger, therewith, the power feeding control apparatus performs the feeding changeover control comprising the steps of: feeding only to a predetermined one particular charger at the early stage of the start of charging, in which stage a large charging current flows into a storage battery; monitoring inflow current of the predetermined one particular charger; and switching power feeding to another charger to start feeding thereto when the inflow current reduces to the charging saturation current (a current still flowing even at the fully charged state).

According to the present invention, a power feeding control apparatus and a charging system that are capable of efficiently charging plural storage batteries using a power source of which load-capacity is controlled can be actualized.

Further, according to the present invention, a power feeding control apparatus and a charging system that are capable of efficiently charging plural storage batteries using a commercial power supply of which load capacity is limited can be actualized.

Again further, according to the present invention, a power feeding control apparatus and a charging system that are capable of efficiently charging plural storage batteries using one single outlet under a commercial power supply of which load capacity is limited can be actualized.

Still further, according to the present invention, a power feeding control apparatus and a charging system that are capable of efficiently charging plural storage batteries using one single outlet under a commercial power supply of which load capacity is limited (to be within 100 V, 1.5 kVA) can be actualized.

Still again further, according to the present invention, a power feeding control apparatus and charging system that are capable of transmitting an E-mail of the working status over a communication line can be actualized.

DETAILED DESCRIPTION OF THE PREFERRED EMBODIMENT

The present invention offers a charging system structured in such a manner that a power feeding control apparatus distributes the alternating-current voltage received form a single alternating-current power source to plural chargers; each of the plural chargers rectifies and smoothes the alternating-current voltage received from the alternating-current power source; and thereby plural storage batteries connected to each of the plural chargers can be charged parallel, wherein the power feeding control apparatus is configured so that a changeover control of the feeding of the alternating-current voltage to each charger will be performed monitoring the magnitude of the alternating current flowing in each charger, therewith, the power feeding control apparatus performs the feeding changeover control comprising the steps of: feeding only to a predetermined one particular charger at the early stage of the start of charging, in which stage a large charging current flows into a storage battery; monitoring inflow current of the predetermined one particular charger; and switching power feeding to another charger to start feeding thereto when the inflow current reduces to the charging saturation current (a current still flowing even at the fully charged state).

In the charger to be power-fed at first, the maximum charging current thereof is limited so that the maximum value of the alternating current flowing from the power feeding control apparatus will correspond to the load capacity limit of an outlet.

In the charger to be power-fed in the next to the first, the maximum charging current thereof is limited so that the maximum value of the alternating current flowing from the power feeding control apparatus will correspond to the remainder of subtraction of such a current as is equivalent to the charging saturation current value flowing in the charger, which is to be power-fed at first, from the load capacity limit of an outlet.

In a configuration where another charger is connected further to the above-stated chargers, the maximum charging current of such charger, which is to be subsequently power-fed, is limited so that the maximum value of the alternating current flowing from the power feeding control apparatus will correspond to the remainder of subtraction of: such a current value as is equivalent to the charging saturation current flowing in the charger to be power-fed at first and such a current value as is equivalent to the charging saturation current flowing in the charger to be power-fed in the next to the first, from the load capacity limit of an outlet.

Embodiment 1

Figure 1:
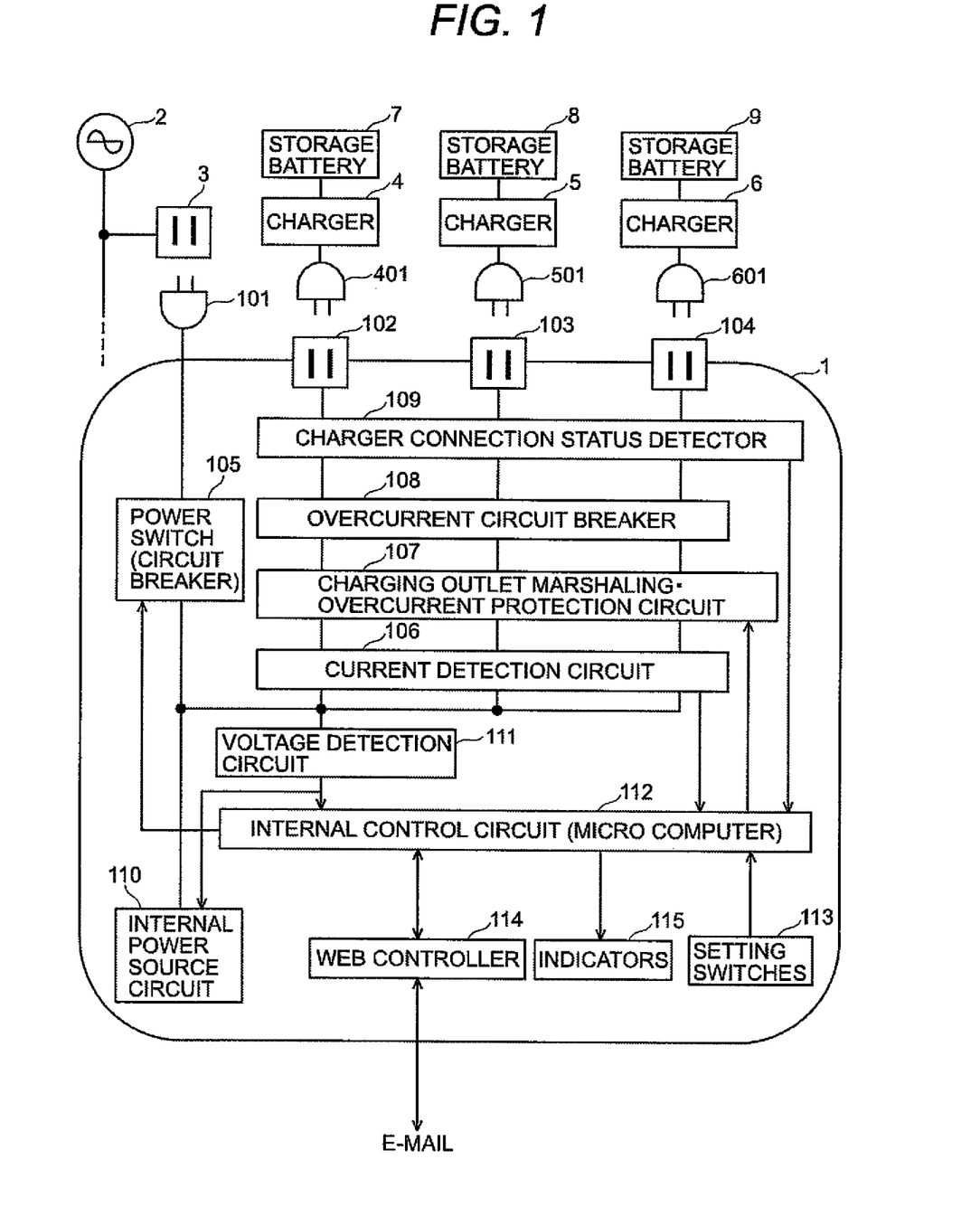
FIG. 1 is a functional block diagram of the storage battery charging system in the embodiment 1 of the present invention.

FIG. 1 is a functional block diagram of a storage battery charging system.

A power feeding control apparatus 1, receiving power through a power-reception plug 101 connected to an outlet 3 (load capacity limit 100 V ac, 1.5 kVA) on a commercial power supply 2 (100 V ac), outputs power for chargers (100 V ac) to three output-outlets 102, 103, and 104 through various controlling circuits.

Three chargers 4, 5, and 6 are connected to the output-outlets 102 to 104 through power-reception plugs 401, 501, and 601 to receive power, which is voltage-transformed, rectified, and smoothed to charge batteries 7, 8, and 9.

The power feeding control apparatus 1 feeds the 100 V ac commercial power, received on the power-reception plug 101, to the output-outlets 102 to 104 through a power switch 105 having a circuit breaking function that trips to interrupt at a load current of 30 A and further through a current detection circuit 106, a charging outlet changeover and overcurrent protection circuit 107, an overcurrent circuit breaker (fuse) 108, and a charger connection status detector 109; an internal power source circuit 110 and a voltage detection circuit 111 are also power-fed from the power feeding apparatus 1.

An internal control circuit 112, being comprised of a microcomputer, works receiving an internal direct current power outputted from the internal power source circuit 110. The internal control circuit 112 performs operational control according to the commands sent from input switches 113 and a Web controller 114 indicating the control status on indicators 115, and performs control processing for sending the status to the Web controller 114.

The input switches 113 have a start switch, a current setting switch to set values of current settings, and a mode setting switch.

The Web controller 114 is configured using an existing Web controller.

The indicators 115 are comprised of on-operation indicator lamps; mode indication lamps; charging status indicator lamps provided correspondingly to output-outlets 102, 103, and 104, wherein each of the lamps has a triad of green-, orange-, and red-lamp; and an auxiliary battery operation indicator lamp.

Figure 2:
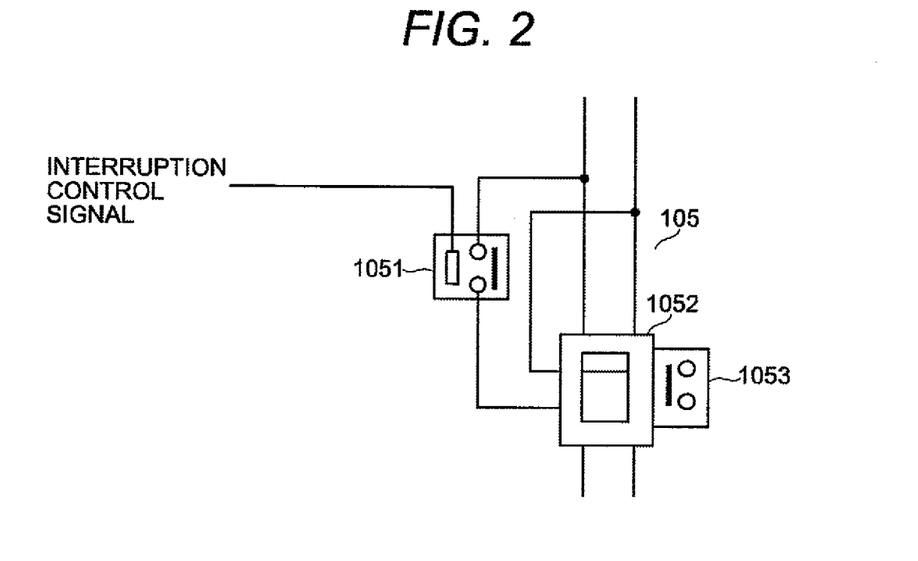
FIG. 2 is a circuit diagram of the details of configuration of the power switch in the embodiment 1 of the present invention.

Detailed explanation of the composition of the power switch 105 referring to FIG. 2 is as follows: The power switch 105, an electro-magnetically manipulable switch, remotely operates an electro-magnetic relay 1051 causing a switch 1052, placed in a current-flowing circuit, to open the circuit thereon. The switch 1052 has an external output contact 1053 built therein, which is interlocked with an on-off contact for energizing control.

Figure 3:
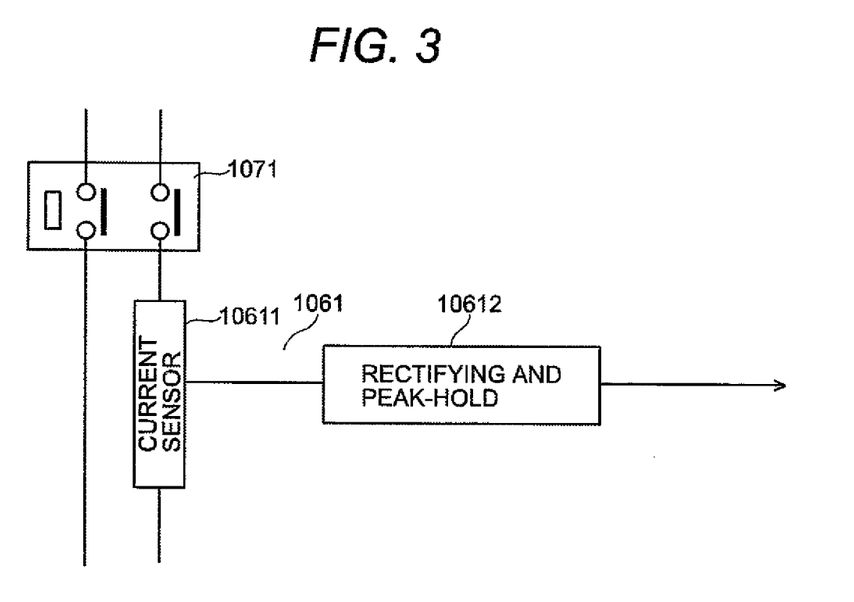
FIG. 3 is a circuit diagram of the details of configuration of the current detection circuit in the embodiment 1 of the present invention.

Detailed explanation of the composition of the current detection circuit 106 referring to FIG. 3 is as follows: The current detection circuit 106 is a circuit that detects currents flowing through the output-outlets 102 to 104. FIG. 3 shows the current detection circuit 1061 that uses a current sensor 10611 placed in the input circuit of an electro-magnetic switch 1071 in the charging outlet changeover and overcurrent protection circuit 107, which will be described later referring to FIG. 4.

The current sensor 1611 uses a current measuring Hall device to generate an alternating current detection signal, which is converted into a direct current signal of detected current value by a rectifying and peak-hold circuit 10612 and then outputted.

Other current detection circuits 1062 and 1063 corresponding respectively to the input circuits of electro-magnetic switches 1072 and 1073 are composed likewise.

Figure 4:
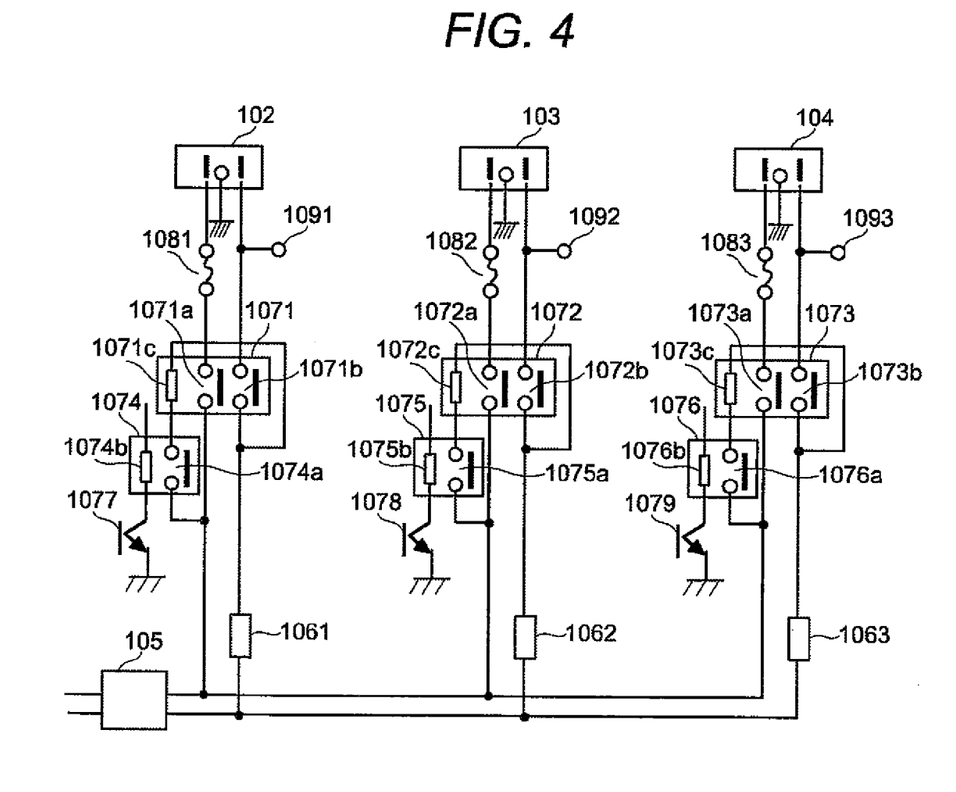
FIG. 4 is a circuit diagram of the details of configuration of the charging outlet changeover and overcurrent protection circuit, and overcurrent circuit breaker in the embodiment 1 of the present invention.

Explanation of detailed composition of the charging outlet changeover and overcurrent protection circuit 107 and the overcurrent circuit breaker (fuse) 108 follows referring to FIG. 4. The charging outlet changeover and overcurrent protection circuit 107 selectively switches the allocation of feeding to the output-outlets 102 to 104 and shuts the feeding when overcurrent flows. The overcurrent circuit breaker 108 is a circuit means for interrupting feeding by blowout when a current that possibly endangers flows through the output-outlets 102 to 104.

FIG. 4 details the circuitry covering from the power switch 105 down to each of the output-outlets 102 to 104.

The charging outlet changeover and overcurrent protection circuit 107 has such a structure that: on-off contacts 1071a, 1071b, 1072a, 1072b, 1073a, and 1073b respectively of electro-magnetic switches 1071, 1072, and 1073 are inserted in the circuits that feed the 100 V ac commercial power to each of the output-outlets 102 to 104; exciting currents of electro-magnetic coils 1071c, 1072c, and 1073c respectively of the electro-magnetic switches 1071 to 1073 are controlled by on-off contacts 1074a, 1075a, and 1076a of control relays 1074, 1075, and 1076; and electro-magnetic coils 1074b, 1075b, and 1076b respectively of the control relays 1074 to 1076 are controlled by controlling transistors 1077, 1078, and 1079 that are under the control of the internal control circuit 112.

The electro-magnetic switches 1071 to 1073, being controlled indirectly by the internal control circuit 112 according to a control program, switch power feeding to each of the output-outlets 102 to 104 and severally interrupt the power feeding to the output-outlets 102 to 104 through which overcurrent flows.

The overcurrent circuit breaker 108 is comprised of overcurrent-blowout type fuses 1081, 1082, and 1083, which are inserted correspondingly in the circuits between the output-outlets 102 to 104 and the on-off contacts 1071a to 1073a of the charging outlet changeover and overcurrent protection circuit 107.

Figure 5:
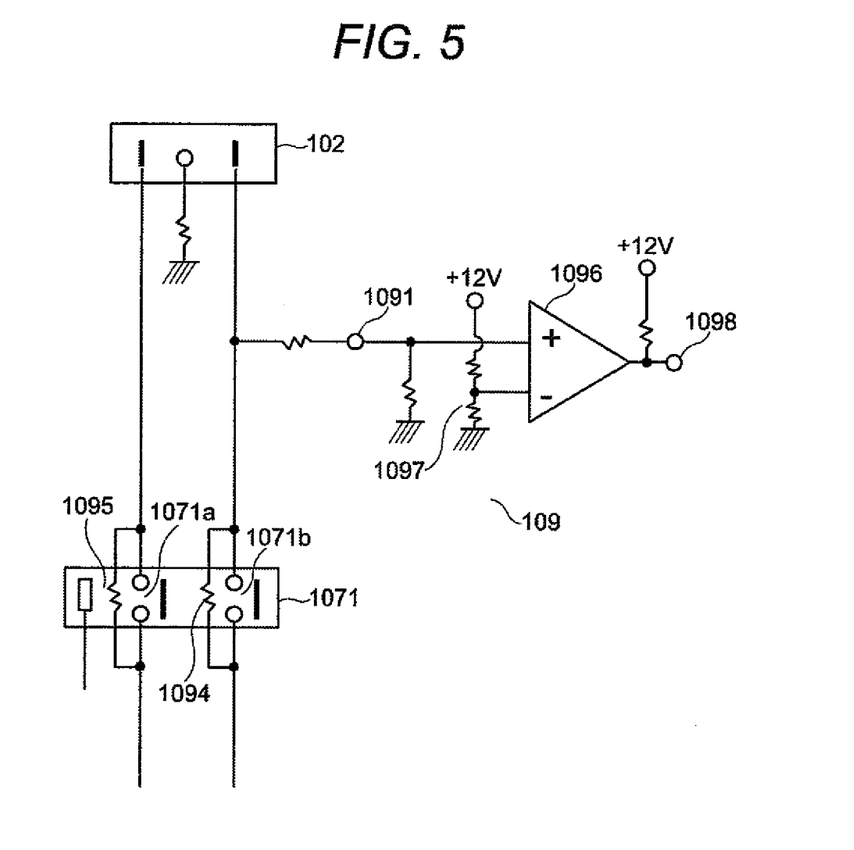
FIG. 5 is a circuit diagram of the details of configuration of the charger connection status detector in the embodiment 1 of the present invention.

The charger connection status detector 109 has charging connection status detection terminals 1091, 1092, and 1093 for detection of existence or non-existence of the connections of the power-reception plugs 401 to 601 for the chargers 4 to 6 with the output-outlets 102 to 104.

The following explains details of the structure of the charger connection status detector 109 referring to FIG. 5. The charger connection status detector 109 examines whether each of the power-reception plugs 401 to 601 of the chargers 4 to 6 is connected to the output-outlets 102 to 104 by determining potentials of detection terminals 1091, 1092, and 1092. The description here takes the detection of connection status of the power-reception plug 401 to the output-outlet 102 as an explanatory example.

The load impedance of the output-outlet 102 is nearly infinite when the power-reception plug 401 is not connected thereto, but the impedance decreases to a value equivalent to the internal impedance of the charger 4 when the power-reception plug 401 is connected.

The charger connection status detector 109 works using this behavior. The detector is given parallel connections of bypass resistors 1094 and 1095 severally with the on-off contacts 1071a and 1071b of the electro-magnetic switch 107 to produce leakage current. This circuitry causes the potential of the detection terminal 1091 to vary depending on whether the power-reception plug 401 is connected to the output-outlet 102. Being inputted in a comparison circuit 1096, the potential of the detection terminal 1091 is compared with the comparison reference potential produced by a voltage dividing resistor circuit 1097. The comparison circuit 1096 examines whether the power-reception plug 401 is connected to the output-outlet 102, and then outputs detection signal to an output terminal 1098.

The charger connection status detector 109 can be also actualized using a micro switch provided in such a manner that the power-reception plug 401 actuates the micro switch when the plug is connected to the output-outlet 102.

Figure 6:
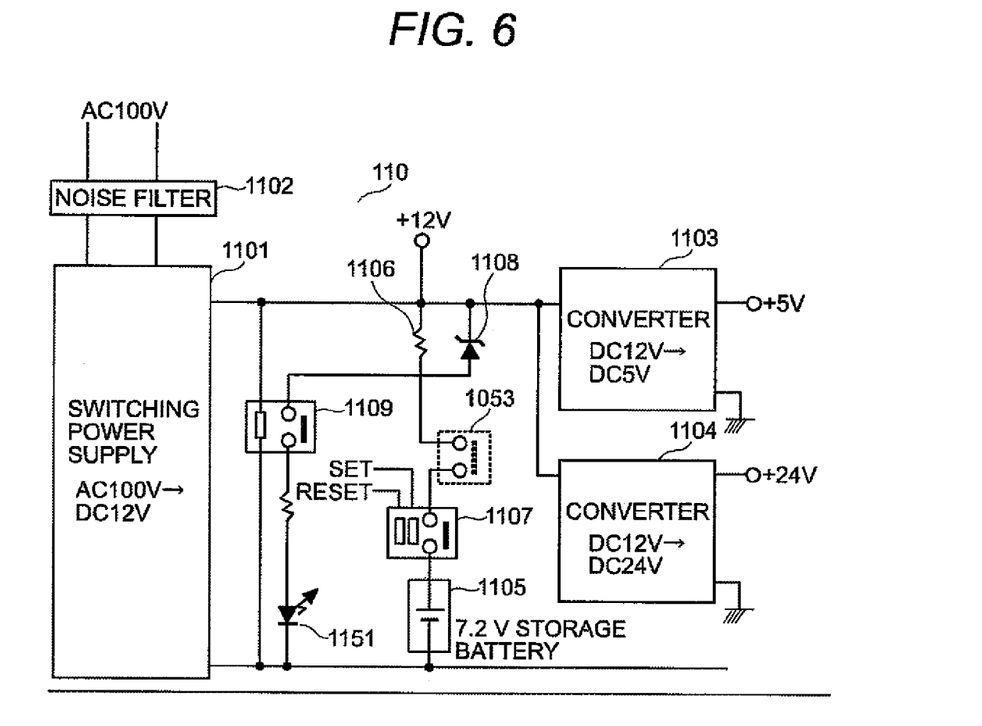
FIG. 6 is a circuit diagram of the details of configuration of the internal power source circuit in the embodiment 1 of the present invention.

The following explains details of the structure of the internal power source circuit 110 referring to FIG. 6. This internal power source circuit 110 is a means for generating internal direct-current power of low voltages (5 V ac, 12 V ac, and 24 V ac) from 100 V ac power supplied through the power switch 105 or from the power supplied from an auxiliary battery provided in the circuit, on which low voltages the control processing in the apparatus works.

A switching power supply circuit 1101, using a power fed from the 100 Vac commercial power supply through a noise filter 1102, produces a 12 V dc voltage through stepping down, rectifying, and smoothing the supplied voltage. Converters 1103 and 1104 produce 5 V dc and 24 V dc voltages using the direct-current voltage supplied form the switching power supply circuit 1101 or an internal auxiliary battery that will be described later.

A 7.2 V internal auxiliary battery 1105 is, when the working state is normal, charged with a voltage of 12 V dc generated by the switching power supply circuit 1101 through a resistor 1106, the external output contact 1053 of the power switch 105, and a latching relay 1107. If power failure occurs, the power supply is switched to the feeding from the internal battery 1105 through a diode 1108. When the Web controller 114 recognizes occurrence of power failure according to the detection signal received from the voltage detection circuit 111, the control by the Web controller 114 opens the latching relay 1107 in order to interrupt the power feeding form the internal auxiliary battery 1105 to prevent the internal auxiliary battery 1105 from discharging that may occur on completion of the processing by the Web controller 114.

An internal battery working status indicator 1151 of the indicators 115 uses a light emitting diode, which turns on or off controlled by an electro-magnetic relay 1109 that works on the voltage outputted from the switching power supply circuit 1101. When the switching power supply circuit 1101 is on such a working order as is generating the output voltage normally, the electro-magnetic relay 1109 holds its contact open causing the light emitting diode 1151 to be turned off. If the switching power supply circuit 1101 does not generate the output voltage normally because of the power failure of the 100 V ac commercial power supply, the electro-magnetic relay 1109 closes its contact causing the light emitting diode 1151 to be turned on.

The voltage detection circuit 111 examines whether the 100 V ac commercial power is supplied in the apparatus through the power switch 105. The voltage detection circuit 111 is structured using a relay that makes its contact be ON when the 100 V ac commercial power is supplied.

The chargers 4, 5, and 6 to be used in this embodiment are preferably to be configured as described below, although explanatory illustration is omitted.

The first charger 4 is configured so that the maximum value of the current flowing from the received alternating-current voltage will be not greater than a first maximum value (i.e., the load capacity limit of the outlet connected to the commercial power supply, namely 1.5 kVA).

The second charger 5 is configured so that the maximum value of the current flowing from the received alternating-current voltage will be a second maximum value that is the remainder of subtraction of the charging saturation current (2 A) in the charger 4 from the first maximum value.

The third charger 6 is configured so that the maximum value of the current flowing from the received alternating-current voltage will be a third maximum value that is the remainder of subtraction of the charging saturation current in the first charger 4 and the charging saturation current in the second charger 5 from the first maximum value.

The storage battery charging system thus configured executes charging control as described below.

As shown in FIG. 1, the power-reception plug 101 of the power feeding control apparatus 1 is connected to the outlet 3 on the commercial power supply 2, the power-reception plugs 401 to 601 of the charger 4 to 6 are connected to the output-outlets 102 to 104, and the storage batteries 7 to 9 are connected severally to the chargers 4 to 6. The power switch 105 is then turned on; the start-up command is given through the input switches 113 to start charging control.

On starting the charging control, the power feeding control apparatus 1: examines the connection status of the power-reception plugs 401 to 601 with the output-outlets 102 to 104; begins power feeding to the charger 4 that charges the storage battery 7; and monitors the magnitude of the current flowing through the output-outlet 102.

Figure 7:
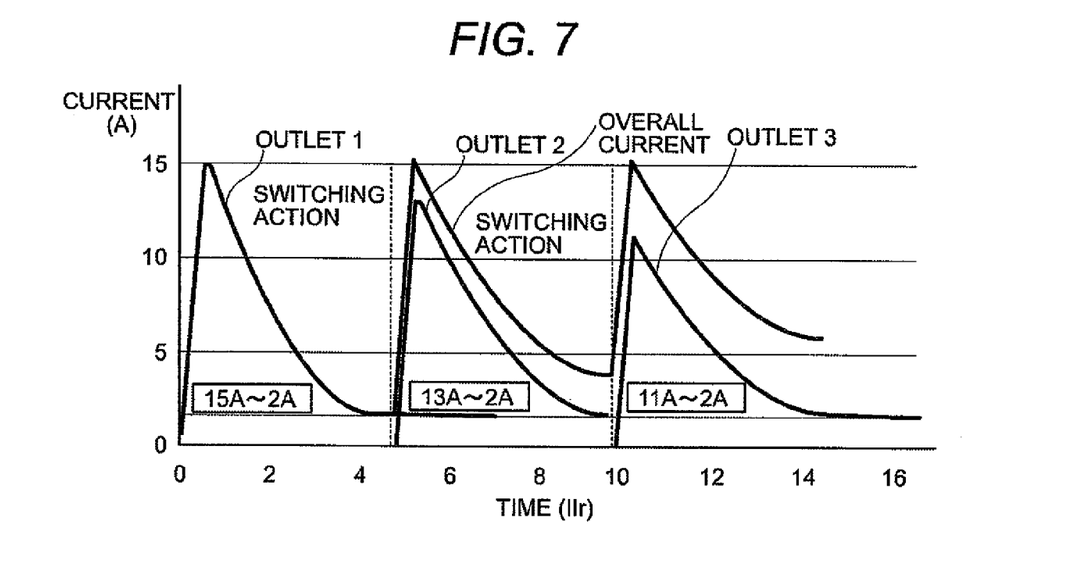
FIG. 7 is a curve that schematically shows the charging current properties of the embodiment 1 of the present invention.

When the monitoring ascertains that the progress of charging the storage battery 7 has lowered the current flowing through the output-outlet 102 to such a value as corresponds to the charging saturation current as shown in FIG. 7, power feeding to the charger 5 for charging the storage battery 8 is started, and then the current flowing thorough the output-outlet 103 is monitored. When the monitoring ascertains that the progress of charging the storage battery 8 has lowered the current flowing through the output-outlet 103 to such a value as corresponds to the charging saturation current, power feeding to the charger 6 for charging the storage battery 9 is started, and then the current flowing through the output-outlet 104 is monitored.

Information about this charging status is transmitted over a communication line in a form of E-mail by the Web controller 114 permitting the one in a place other than a place where the charging system is provided to know the same.

By executing this manner of charging control operation, the overall current that the power feeding control apparatus 1 will take out from the outlet 3 of the commercial power supply for charging storage batteries can be suppressed within the load capacity limit of the outlet 3 with an efficient charging plural storage batteries 7 to 9.

Figure 8:
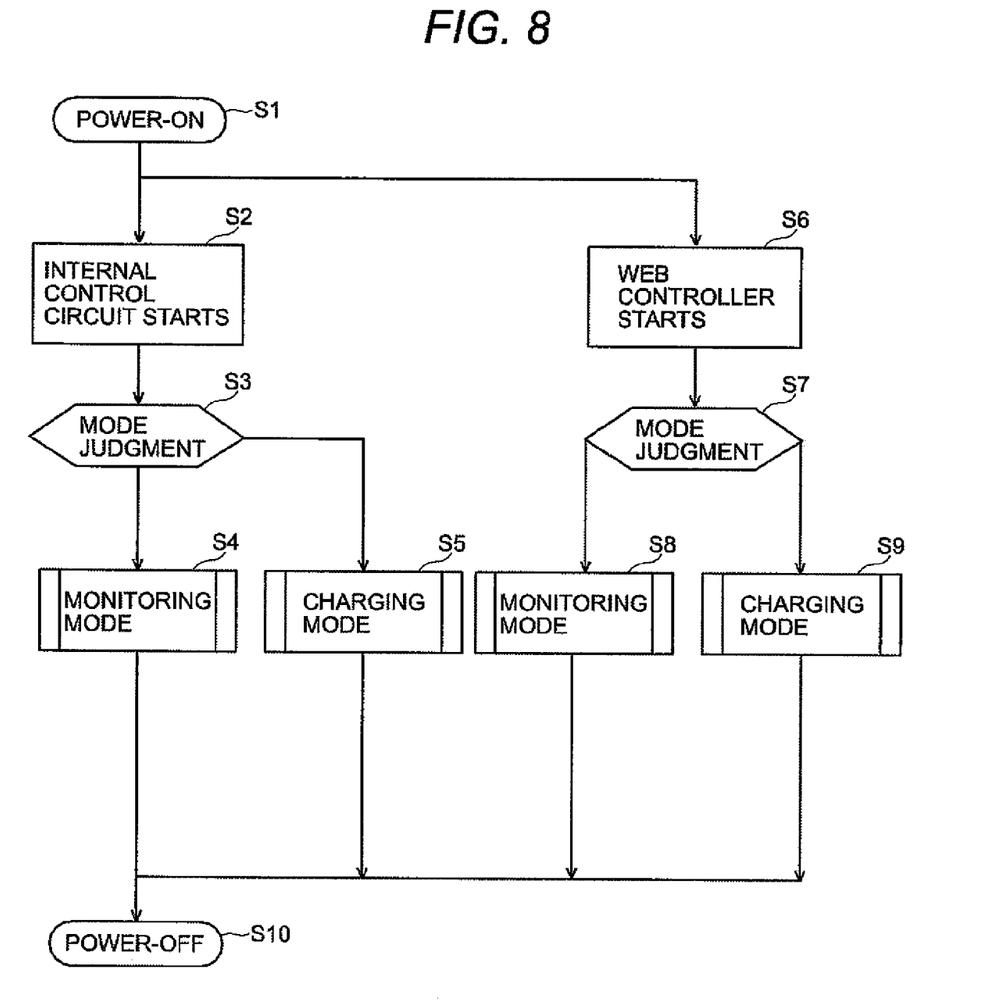
FIG. 8 is a flowchart that shows an entire scheme of the control processing of the operational control in the embodiment 1 of the present invention.

FIG. 8 is a flowchart that shows an entire scheme of the control processing of the operational control in this charging system.

Step S1
When the power switch 105 is turned on with the power-reception plug 101 of the power feeding control apparatus 1 connected to the outlet 3, the internal power source circuit 110 begins functioning to activate the internal power supply and starts supplying power to the internal control circuit 112 and the Web controller 114. An input at the operation start switch of input switches 113 causes the charging control operation to start.

Step S2
The internal control circuit 112 starts control processing.

Step S3
The internal control circuit 112, which has started control processing, performs the mode judgment according to the setting defined by the mode setting switch of the input switches 113 to branch the processing.

Step S4
The control processing under the monitoring mode is performed.

Step S5
The control processing under the charging mode is performed.

Step S6
The Web controller 114 starts the control processing.

Step S7
The Web controller 114, which has started the control processing, performs the mode judgment according to the setting defined by the mode setting switch of the input switches 113 to branch the processing.

Step S8
The control processing under the monitoring mode is performed.

Step S9
The control processing under the charging mode is performed.

Step S10
On completion of the control processing under respective mode, the control processing for turning off the power switch 105 is performed.

Figure 9:
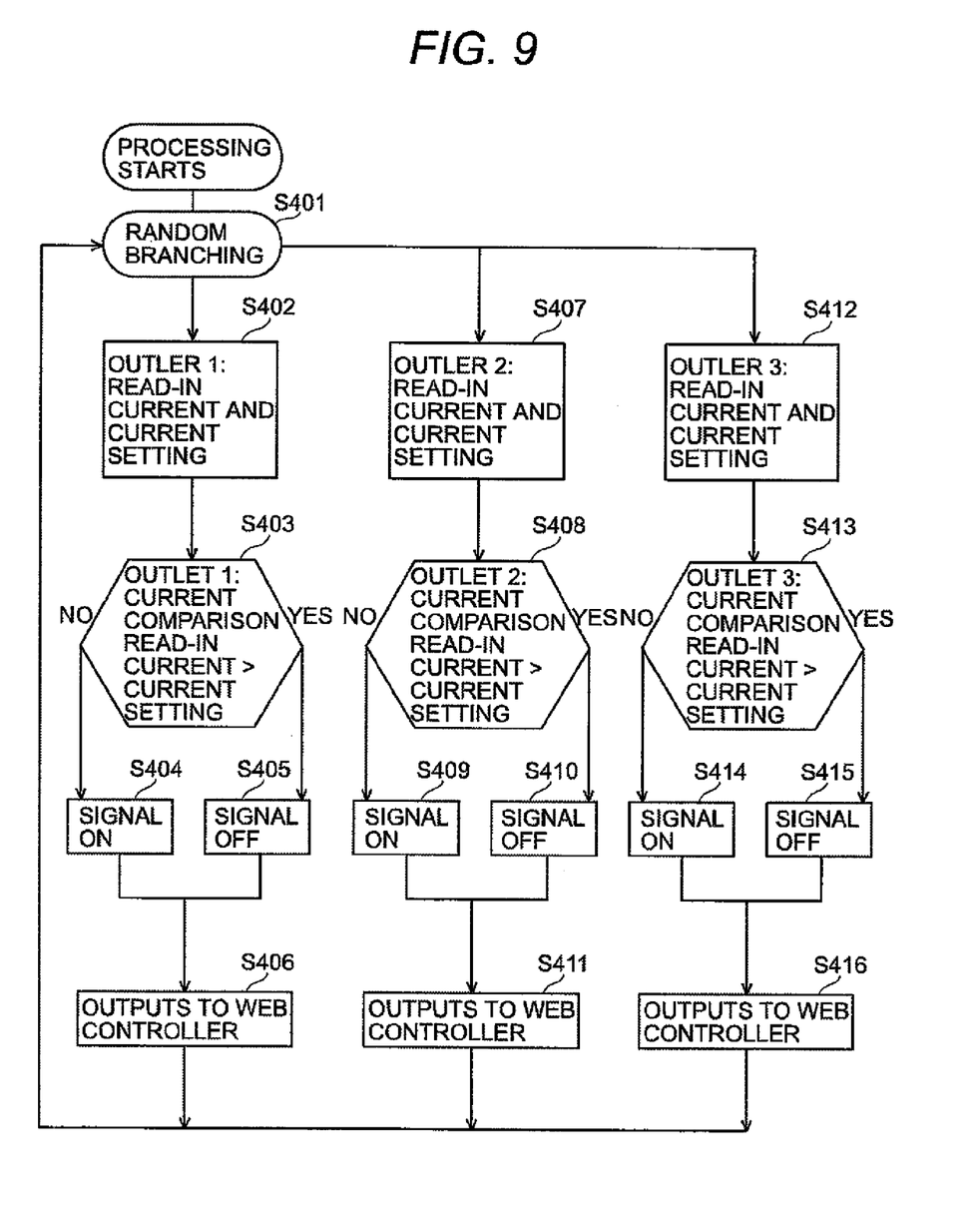
FIG. 9 is a flowchart that shows the details of the control processing under the monitoring mode that the internal control circuit in the embodiment 1 of the present invention executes.

FIG. 9 is a flowchart that shows the details of the control processing under the monitoring mode (Step S4) that the internal control circuit 112 executes.

Step S401
On starting the control processing under the monitoring mode, the internal control circuit 112 causes processing to branch randomly to one of the processing for the outlets 102(1), 103(2), and 103(3).

Step S402
The detected current value (load current) on the current detection circuit 1061 that corresponds to the output-outlet (1) 102 and the current setting (a reference value determined by the input switch 113 for judgment whether the load is connected) are read-in.

Step S403
The processing branches following the larger-or-smaller comparison of the detected current value corresponding to the output-outlet 102 with the current setting.

Step S404
If the detected current value is not larger than the current setting, the detection signal ON is generated.

Step S405
If the detected current value is larger than the current setting, the detection signal OFF is generated.

Step S406
Generated detection signal is outputted to the Web controller 114.

Step S407
The detected current value on the current detection circuit 1062 that corresponds to the output-outlet (2) 103 and the current setting are read-in.

Step S408
The processing branches following the larger-or-smaller comparison of the detected current value corresponding to the output-outlet 103 with the current setting.

Step S409
If the detected current value is not larger than the current setting, the detection signal ON is generated.

Step S410
If the detected current value is larger than the current setting, the detection signal OFF is generated.

Step S411
Generated detection signal is outputted to the Web controller 114.

Step S412
The detected current value on the current detection circuit 1063 that corresponds to the output-outlet (3) 104 and the current setting are read-in.
Step S413
The processing branches following the larger-or-smaller comparison of the detected current value corresponding to the output-outlet 104 with the current setting.
Step S414
If the detected current value is not larger than the current setting, the detection signal ON is generated.
Step S415
If the detected current value is larger than the current setting, the detection signal OFF is generated.
Step S416
Generated detection signal is outputted to the Web controller 114.

Figure 10:
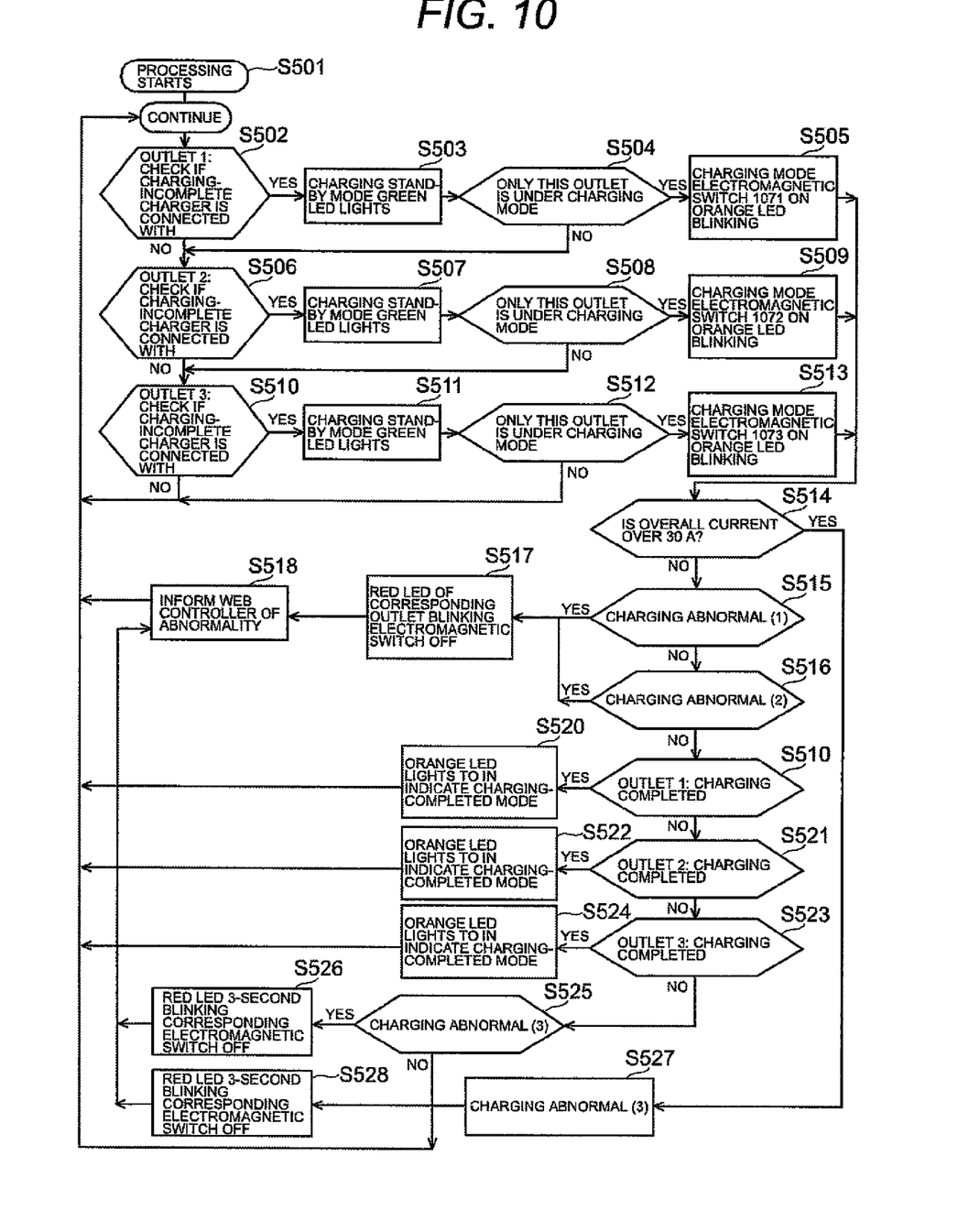
FIG. 10 a flowchart that shows the details of the control processing under the charging mode that the internal control circuit in the embodiment 1 of the present invention executes.

FIG. 10 is a flowchart that shows the details of the control processing under the charging mode (Step S5) that the internal control circuit 112 executes.
Step S501
On starting the control processing under the charging mode, the internal control circuit 112 executes branching process of repeated ascertainment whether any of the power-reception outlets 401 to 601 of the chargers 4 to 6 in the charging being incomplete state is connected to the output-outlets 102 to 104.
Step S502
The processing branches following the ascertainment whether the power-reception plug 401 of the charger 4 in the charging being incomplete state is connected to the output-outlet 102.
Step S503
If the power-reception plug 401 of the charger 4 in the charging being incomplete state is connected to the output-outlet 102, the power feeding control over the output-outlet 102 (charger 4) is set being under the charging wait mode and the corresponding charging status indication lamp (green LED) is turned on.
Step S504
The processing branches following ascertainment whether the other output-outlets 103 and 104 (chargers 5 and 6) are set being under the charging mode.
Step S505
If the other output-outlets 103 and 104 (chargers 5 and 6) are not set being under the charging mode, the output-outlet 102 is set being under the charging mode (the on-off contacts 1071*a* and 1071*b* of the electro-magnetic switch 1071 being ON, and the corresponding charging status indication lamp (orange LED) blinking).
Step S506
If the power-reception plug 401 of the charger 4 in the charging incomplete state is not connected to the output-outlet 102, and if, at step S504, the other outlets are under the charging mode, the processing branches following ascertainment whether the power-reception plug 501 of the charger 5 in the charging being incomplete state is connected to the output-outlet 103.
Step S507
If the power-reception plug 501 of the charger 5 in the charging being incomplete state is connected to the output-outlet 103, the power feeding control over the output-outlet 103 (charger 5) is set being under the charging wait mode and the corresponding charging status indication lamp (green LED) is turned on.

Step S508
The processing branches following ascertainment whether the other output-outlets 102 and 104 (chargers 4 and 6) are set being under the charging mode.
Step S509
If the other output-outlets 102 and 104 (chargers 4 and 6) are not set being under the charging mode, the output-outlet 103 is set being under the charging mode (the on-off contacts 1072*a* and 1072*b* of the electro-magnetic switch 1072 being ON, and the corresponding charging status indication lamp (orange LED) blinking)
Step S510
If the power-reception plug 501 of the charger 5 in the charging incomplete state is not connected to the output-outlet 103, and if, at step S508, the other outlets are under the charging mode, the processing branches following ascertainment whether the power-reception plug 601 of the charger 6 in the charging being incomplete state is connected to the output-outlet 104.
Step S511
If the power-reception plug 601 of the charger 6 in the charging being incomplete state is connected to the output-outlet 104, the power feeding control over the output-outlet 104 (charger 6) is set being under the charging wait mode and the corresponding charging status indication lamp (green LED) is turned on.
Step S512
The processing branches following ascertainment whether the other output-outlets 102 and 103 (chargers 4 and 5) are set being under the charging mode.
Step S513
If the other output-outlets 102 and 103 (chargers 4 and 5) are not set being under the charging mode, the output-outlet 104 is set being under the charging mode (the on-off contacts 1073*a* and 1073*b* of the electro-magnetic switch 1073 being ON, and the corresponding charging status indication lamp (orange LED) blinking).
Step S514
The processing branches following judgment whether the overall current flowing through the output-outlets 102 to 104 is larger than 30 A.
Step S515
If the overall current is not larger than 30 A, it is judged whether the charging current of the charger under the charging mode has decreased below the value of the specified ratio (1/2, for example) to the charging current at the beginning of charging after the elapse of specified length of time (four hours after the beginning of charging, for example). If the charging current has not decreased below the specified rate, the situation is judged as having occurrence of the charging anomaly (1).
Step S516
It is judged whether the charging current is within the specified range (0.5 to 0.008 A, for example). If the charging current is within the specified range, the situation is judged as having occurrence of the charging anomaly (2).
Step S517
If the charging anomaly (1) or (2) occurs, the red LED of the charging indication lamp corresponding to the abnormal outlet among the output-outlets 102 to 104 is made to blink, and the electro-magnetic switches 1071 to 1073 that corresponds to such anomaly among the output-outlets 102 to 104 is made to break (bring the contacts to OFF).
Step S518
The control processing information according to the charging anomaly (1), (2) is sent to the Web controller 114.

Step S519

It is judged whether the charging has been completed monitoring the current flowing through the output-outlet 102. If the inflow current has decreased below the charging saturation current, it is judged that the charging of the storage battery 7 by the charger 4 connected to the output-outlet 102 has been completed. If the output-outlet 102 is not set being under charging mode, this processing is skipped.

Step S520

The output-outlet 102 is set being under the charging-completed mode and the orange LED of the corresponding charging status indication lamp is made to light.

Step S521

If the charging of the storage battery 7 by the charger 4 connected to the output-outlet 102 is not completed, it is judged whether the charging has been completed monitoring the current flowing through the output-outlet 103. If the inflow current has decreased below the charging saturation current, it is judged that the charging of the storage battery 8 by the charger 5 connected to the output-outlet 103 has been completed. If the output-outlet 103 is not set being under charging mode, this processing is skipped.

Step S522

The output-outlet 103 is set being under the charging-completed mode and the orange LED of the corresponding charging status indication lamp is made to light.

Step S523

If the charging of the storage battery 8 by the charger 5 connected to the output-outlet 103 is not completed, it is judged whether the charging has been completed monitoring the current flowing through the output-outlet 103. If the inflow current has decreased below the charging saturation current, it is judged that the charging of the storage battery 9 by the charger 6 connected to the output-outlet 104 has been completed.

Step S524

The output-outlet 104 is set being under the charging-completed mode and the orange LED of the corresponding charging status indication lamp is made to light.

Step S525

It is judged whether any one of the power-reception plugs 401 to 601 of the chargers 4 to 6 is disconnected from the output-outlets 102 to 104 with the charging being incomplete while charging is going on. This judgment is performed by ascertaining the detection signal of the charger connection status detector 109. If disconnected, the situation is judged as having occurrence of the charging anomaly (3).

Step S526

If the charging anomaly (3) occurs, the red LED of the charging indication lamp corresponding to the abnormal output-outlet among the output-outlets 102 to 104 is made to blink, and the electro-magnetic switch corresponding to such anomaly among the electro-magnetic switches 1071 to 1073 is made to break (bring the contacts to OFF). The control then moves to Step S518, wherein the control processing information according to the charging anomaly (3) is sent to the Web controller 114.

Step S527

If the overall current flowing through the output-outlets 102 to 104 is found larger than 30 A at the step S514, the situation is judged to be the charging anomaly (4), because such amount of current means that the load current in the distribution circuit of the commercial power supply is an overcurrent state.

Step S528

If the charging anomaly occurs, the red LED of the charging indication lamp corresponding to the abnormal output-outlet among the output-outlets 102 to 104 is made to blink, and the electro-magnetic switch that corresponds to such anomaly among the electro-magnetic switches 1071 to 1073 is made to break (bring the contacts to OFF). The control then moves to Step S518, wherein the control processing information according to the charging anomaly (4) is sent to the Web controller 114.

Figure 11:
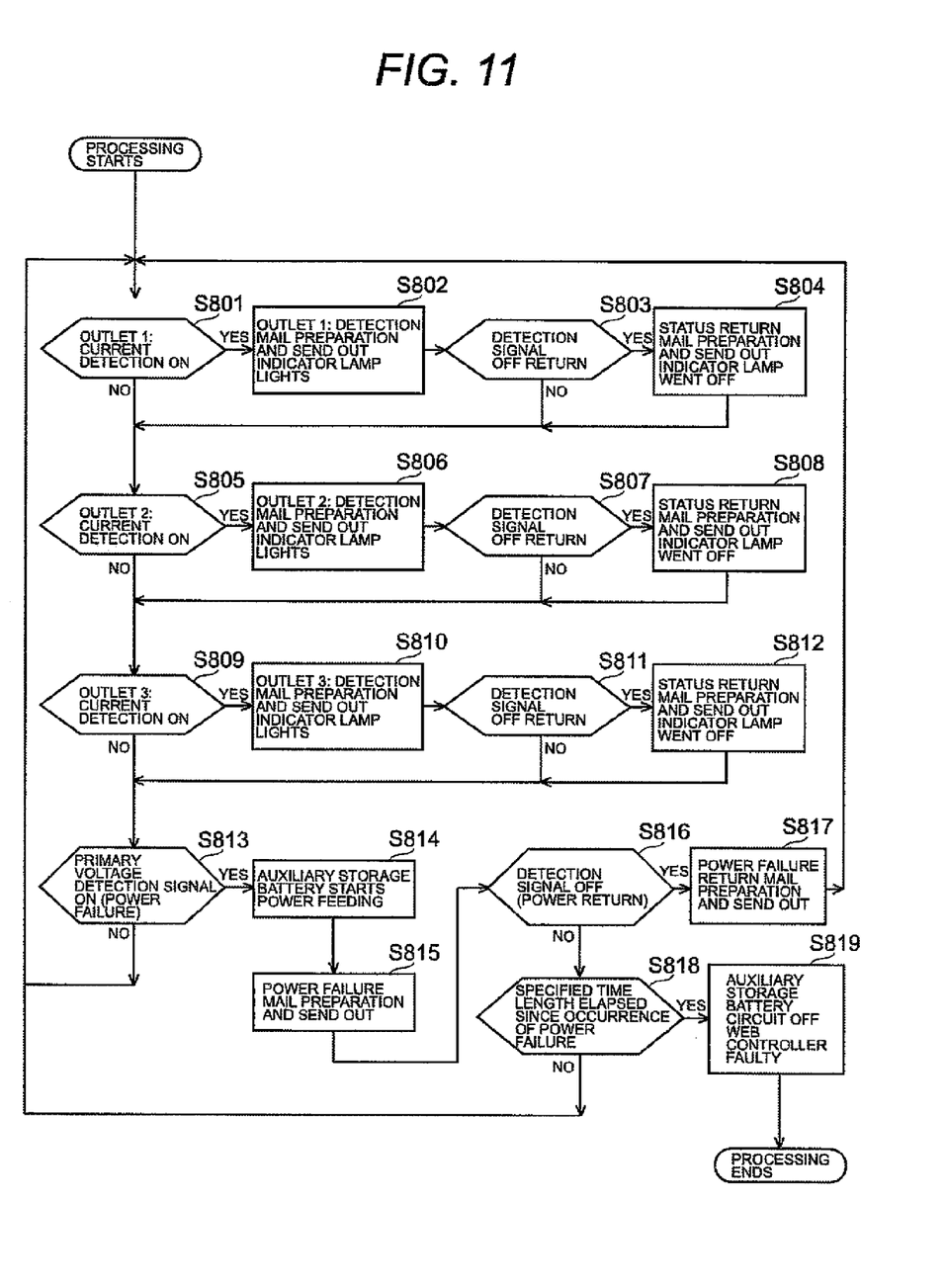
FIG. 11 is a flowchart that shows the details of the control processing under the monitoring mode that the Web controller in the embodiment 1 of the present invention executes.

FIG. 11 is a flowchart that shows the details of the control processing (Step S8) under the monitoring mode that the Web controller 114 executes.

The control processing is performed monitoring: whether the current detection signal (the output at Step S406) corresponding to each of the outlets 102(1), 103(2), and 104(3) is ON or OFF; and whether the primary side voltage detection signal is ON (power failure) or OFF (power failure recovered).

Step S801

The processing branches following the judgment whether the current detection signal corresponding to the outlet (1) 102 is ON.

Step S802

E-mail is prepared and transmitted reporting the outlet (1) 102 having a load; the indication lamp is turned on to indicate such status.

Step S803

The processing branches following judgment whether the current detection signal corresponding to the outlet (1) 102 is OFF.

Step S804

E-mail is prepared and transmitted reporting the outlet (1) 102 having become no-load state; the indication lamp is turned off.

Step S805

The processing branches following the judgment whether the current detection signal corresponding to the outlet (2) 103 is ON.

Step S806

E-mail is prepared and transmitted reporting the outlet (2) 103 having a load; the indication lamp is turned on to indicate such status.

Step S807

The processing branches following judgment whether the current detection signal corresponding to the outlet (2) 103 is OFF.

Step S808

E-mail is prepared and transmitted reporting the outlet (2) 103 having become no-load state; the indication lamp is turned off.

Step S809

The processing branches following the judgment whether the current detection signal corresponding to the outlet (3) 104 is ON.

Step S810

E-mail is prepared and transmitted reporting the outlet (3) 104 having a load; the indication lamp is turned on to indicate such status.

The processing branches following judgment whether the current detection signal corresponding to the outlet (3) 104 is OFF.

Step S812

E-mail is prepared and transmitted reporting the outlet (3) 104 having become no-load state; the indication lamp is turned off.

Step S813

The processing branches following judgment whether the detection signal of the voltage detection circuit 111 is ON (power failure)

Step S814
On occurrence of power failure, power feeding from the internal auxiliary battery 1105 automatically starts.
Step S815
E-mail is prepared and transmitted reporting occurrence of power failure.
Step S816
The processing branches following judgment whether the detection signal has become OFF on recovery of the power failure.
Step S817
On recovery of the power failure with the detection signal being ON, E-mail is prepared and transmitted reporting recovery of the power failure.
Step S818
The processing branches following judgment whether a specified length of time has lapsed after the occurrence of the power failure.
Step S819
If the power failure is not recovered within the specified length of time, the latching relay 1107 is made to be OFF to interrupt the power feeding from the internal auxiliary battery 1105.

Figure 12:
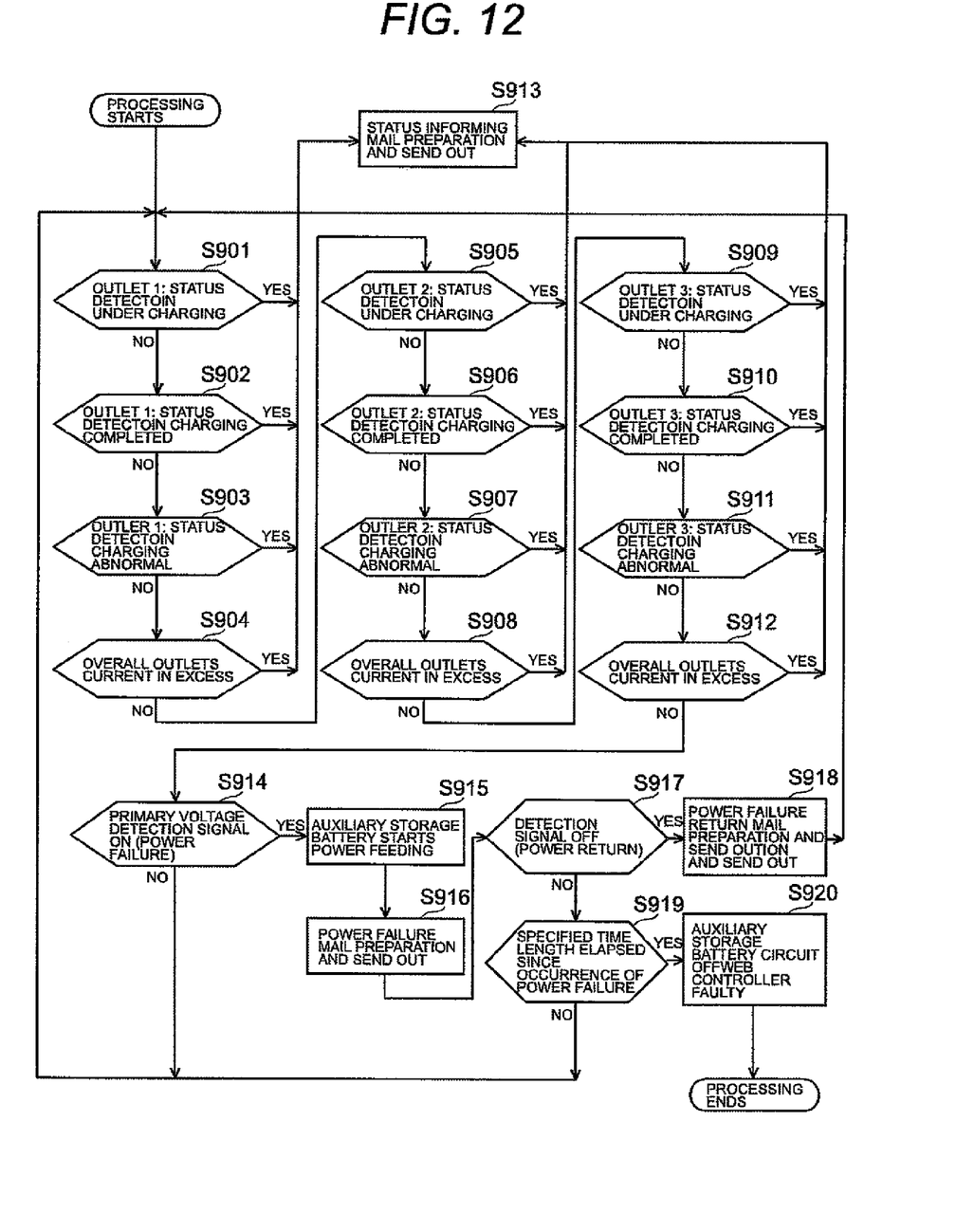
FIG. 12 is a flowchart that shows the details of the control processing under the charging mode that the Web controller in the embodiment 1 of the present invention executes.

FIG. 12 is a flowchart that shows the details of the control processing (Step S9) under the charging mode that the Web controller 114 executes. The control processing is performed monitoring: the reported information received from the internal control circuit 112 about each of the outlets 102(1), 103(2), and 104(3); and whether the primary side voltage detection signal is ON (power failure) or OFF (power failure recovered).

Step S901
The processing branches following judgment whether the status detection information corresponding to the outlet (1) 102 indicates "under charging".
Step S902
The processing branches following judgment whether the status detection information corresponding to the outlet (1) 102 indicates "charging completed".
Step S903
The processing branches following judgment whether the status detection information corresponding to the outlet (1) 102 indicates "charging anomaly".
Step S904
The processing branches following judgment whether the overall current flowing through the outlets 102 to 104 is "overcurrent" (charging anomaly 4).
Step S905
The processing branches following judgment whether the status detection information corresponding to the outlet (2) 103 indicates "under charging".
Step S906
The processing branches following judgment whether the status detection information corresponding to the outlet (2) 103 indicates "charging completed".
Step S907
The processing branches following judgment whether the status detection information corresponding to the outlet (2) 103 indicates "charging anomaly".
Step S908
The processing branches following judgment whether the overall current flowing through the outlets 102 to 104 is "overcurrent" (charging anomaly 4).
Step S909
The processing branches following judgment whether the status detection information corresponding to the outlet (3) 104 indicates "under charging".
Step S910
The processing branches following judgment whether the status detection information corresponding to the outlet (3) 104 indicates "charging completed".
Step S911
The processing branches following judgment whether the status detection information corresponding to the outlet (3) 104 indicates "charging anomaly".
Step S912
The processing branches following judgment whether the overall current flowing through the outlets 102 to 104 is "overcurrent" (charging anomaly 4).
Step S913
If the judgment at each of the steps stated above (steps S901 to S912) says "Yes", E-mail is prepared and transmitted reporting such "Yes-status".
Step S914
If the judgment at each of the steps stated above (steps S901 to S912) says "No", the processing branches following judgment whether the detection signal of the voltage detection circuit 111 is ON (power failure).
Step S915
On occurrence of power failure, the power feeding from the internal auxiliary battery 1105 automatically starts.
Step S916
E-mail is prepared and transmitted reporting occurrence of power failure.
Step S917
The processing branches following judgment whether the detection signal has become OFF on recovery of the power failure.
Step S918
On recovery of the power failure with the detection signal being ON, E-mail is prepared and transmitted reporting recovery of the power failure.
Step S919
The processing branches following judgment whether a specified length of time has lapsed after the occurrence of the power failure.
Step S920
If the power failure is not recovered within the specified length of time, the latching relay 1107 is made to be OFF to interrupt the power feeding from the internal auxiliary battery 1105.

Embodiment 2

The power feeding control apparatus 1 in the embodiment 1 can be used being connected to loads (electrical devices) other than chargers. In this style of use, the internal control circuit 112 and the Web controller 114 work only in the monitoring mode.

What is claimed is:
1. A charging system comprising a power feeding control apparatus that distributes the alternating-current voltage received from a single alternating-current power source to plural chargers, and a plurality of chargers that rectify and smooth said alternating-current voltage received from said power feeding control apparatus to charge plural storage batteries connected in parallel,
wherein said power feeding control apparatus performs power feeding changeover control processings comprising the steps of feeding only to a first charger at an early stage of the start of charging, in which stage a large charging current flows into a first storage battery; starting the power feeding to a second charger when an inflow current of said first charger reduces to a charging saturation current by monitoring said inflow current of said first charger; and starting the power feeding to a third charger when an inflow current of said second charger reduces to a charging saturation current by monitoring said inflow current of said second charger, and wherein said first charger is configured so that the maximum value of the inflow current of the received alternating-current voltage will be not greater than a first maximum value; said second charger is configured so that the maximum value of the inflow current of the received alternating-current voltage will be a second maximum value that is the remainder of subtraction of charging saturation current of said first charger from said first maximum value; said third charger is configured so that the maximum value of the inflow current of the received alternating-current voltage will be a third maximum value that is the remainder of subtraction of said charging saturation current of said first charger and charging saturation current of said second charger from said first maximum value.

2. The charging system according to claim 1, wherein said power feeding control apparatus receiving said alternating-current voltage is connected to a single outlet under a commercial power supply.

3. The charging system according to claim 1, wherein said power feeding control apparatus is comprised of a plurality of output-outlets to which chargers are to be connected, and a means of detection of existence or non-existence of connections of chargers for detecting such chargers as are connected with said output-outlets.

4. The charging system according to claim 1, wherein said power feeding control apparatus is comprised of a control circuit that executes said control processings, and a Web controller that reports charging status on E-mail over a communication line.

* * * * *